(12) United States Patent
Chang

(10) Patent No.: US 11,693,300 B2
(45) Date of Patent: Jul. 4, 2023

(54) ILLUMINATION SYSTEM AND PROJECTION DEVICE

(71) Applicant: Coretronic Corporation, Hsin-Chu (TW)

(72) Inventor: Min-Chang Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 55 days.

(21) Appl. No.: 17/529,264

(22) Filed: Nov. 18, 2021

(65) Prior Publication Data
US 2022/0155662 A1 May 19, 2022

(30) Foreign Application Priority Data
Nov. 19, 2020 (CN) .......................... 202011300214.2

(51) Int. Cl.
*G03B 21/20* (2006.01)
*G02B 27/28* (2006.01)

(52) U.S. Cl.
CPC .......... *G03B 21/204* (2013.01); *G02B 27/285* (2013.01); *G03B 21/208* (2013.01); *G03B 21/2066* (2013.01); *G03B 21/2073* (2013.01)

(58) Field of Classification Search
CPC .......................... G03B 21/204; G03B 21/2073; G03B 21/208; G03B 21/2066; G02B 27/285
USPC .......................................................... 353/31
See application file for complete search history.

(56) References Cited

U.S. PATENT DOCUMENTS

2017/0195645 A1\* 7/2017 Sakata ................. G02B 27/283

FOREIGN PATENT DOCUMENTS

CN 103543589 1/2014

\* cited by examiner

*Primary Examiner* — Jerry L Brooks
(74) *Attorney, Agent, or Firm* — JCIPRNET

(57) ABSTRACT

An illumination system, including a laser light source, a wavelength conversion module, and a polarization conversion unit, and a projection device are provided. A laser beam of the laser light source is converted to a wavelength conversion beam by a wavelength conversion region of the wavelength conversion module. The polarization conversion unit has multiple first polarization conversion regions and multiple second polarization conversion regions, and includes multiple phase delay sheets correspondingly located on multiple surfaces facing the laser light source and located in the second polarization conversion regions. The wavelength conversion beam with a second polarization state leaves the polarization conversion unit after passing through a surface of the polarization conversion unit in the first polarization conversion regions facing the laser light source. The wavelength conversion beam with a first polarization state leaves the polarization conversion unit after passing through the phase delay sheet in the second polarization conversion region.

24 Claims, 15 Drawing Sheets

ILLUMINATION SYSTEM AND PROJECTION DEVICE

CROSS-REFERENCE TO RELATED APPLICATION

This application claims the priority benefit of China application serial no. 202011300214.2, filed on Nov. 19, 2020. The entirety of the above-mentioned patent application is hereby incorporated by reference herein and made a part of this specification.

BACKGROUND

Technical Field

This disclosure relates to an optical system and an optical device, and in particular to an illumination system and a projection device.

Description of Related Art

In recent years, projection devices with a solid-state light source such as a light-emitting diode (LED) and a laser diode have gradually gained a foothold in the market. Since the laser diode has a higher luminous efficiency of about 20%, projectors having the laser diode as the light source have gradually being developed so as to break through limitations imposed by having the light-emitting diode as the light source.

In general, the projection device with the laser diode as the light source includes optical modules such as a wavelength conversion module, a filter module, a light valve, and a projection lens. Specifically, the filter module is disposed on a back end of a light path of the wavelength conversion module, and the filter module is configured to filter colored lights of different wavelengths coming from the wavelength conversion module, so that a predetermined colored light is produced after passing through the filter module, thereby purifying the color and achieving color saturation. After that, uniformity of the colored beams in the colored light are first adjusted by a homogenizing element, and then adjusted by the light valve to convert into an image beam. The image beam is projected to outside through a projection lens.

However, in the related art, in order to reduce the size of the system, a projection device with a two-segment beam splitting design is provided, which enables a laser beam to be incident from one side of a beam splitting element. In such a projection device, a part of the beam splitting element coated with a single beam splitting film may allow a part of the laser beam to penetrate and reflect the other part concurrently. The laser beam is then transmitted to the filter module and the homogenizing element by the optical element disposed on a back end of a light path, so as to form a blue light path in the system, and enable the laser beam to be incident on the homogenizing element symmetrically.

However, in this kind of projection device, since the light source may only be placed in position on a specific side of the system, the options in disposition positions of the light source are reduced. Moreover, because this projection device adopts a two-segment beam splitting design, the laser beam incident on the homogenizing element will also form two speckles on the homogenizing element, which affects uniformity of the illumination beam and the image.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides an illumination system, which has a small size and is able to provide an illumination beam with good uniformity.

The disclosure provides a projection device, which has a small size and is able to provide an illumination beam with good uniformity.

Other objectives and advantages of the disclosure may be further understood from the technical features disclosed in the disclosure.

In an embodiment of the disclosure, an illumination system is configured to provide an illumination beam. The illumination system includes a laser light source, a wavelength conversion module and a polarization conversion unit. The laser light source is configured to provide a laser beam. The wavelength conversion module has a wavelength conversion region, and the wavelength conversion module is deposed on a transmission path of the laser beam. The laser beam is converted into a wavelength conversion beam by the wavelength conversion region, in which a part of the wavelength conversion beam has a first polarization state, and the other part of the wavelength conversion beam has a second polarization state. The polarization conversion unit is located between the wavelength conversion module and the laser light source. The polarization conversion unit has a plurality of first polarization conversion regions and a plurality of second polarization conversion regions. The polarization conversion unit includes a plurality of phase delay sheets, which are correspondingly located on a plurality of surfaces facing the laser light source and located in the plurality of second polarization conversion regions of the polarization conversion unit. The wavelength conversion beam with the second polarization state leaves the polarization conversion unit after passing through a surface of the polarization conversion unit located in the plurality of first polarization conversion regions facing the laser light source. The wavelength conversion beam with the first polarization state leaves the polarization conversion unit after passing through the phase delay sheet located in the second polarization conversion region.

In an embodiment of the disclosure, a projection device includes the illumination system, a light valve, and a projection lens. The light valve is disposed on a transmission path of the illumination beam and is configured to convert the illumination beam into an image beam. The projection lens is disposed on a transmission path of the image beam and is configured to project the image beam out of the projection device.

Based on the above, the embodiments of the disclosure have at least one of the following advantages or characteristics. In the embodiment of the disclosure, the illumination system and the projection device may enable the laser beam provided by the laser light source to be incident on the polarized beam splitting sheet and the subsequent optical elements in the forward direction through the disposition of the polarization conversion unit, thereby increasing the options in the disposition positions of the light source. In addition, since the micro lens array is disposed on the paths of the laser beam and the wavelength conversion beam in the illumination system and the projection device, the size of the projection device may be reduced while the laser beam and wavelength conversion beam are homogenized concurrently. In addition, in the embodiment, the transmission paths of the laser beam and the wavelength conversion beam after being emitted from the wavelength conversion module are exactly the same. In this way, the overall uniformity of the illumination beam and the image frame can be increased.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting.

On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting.

The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
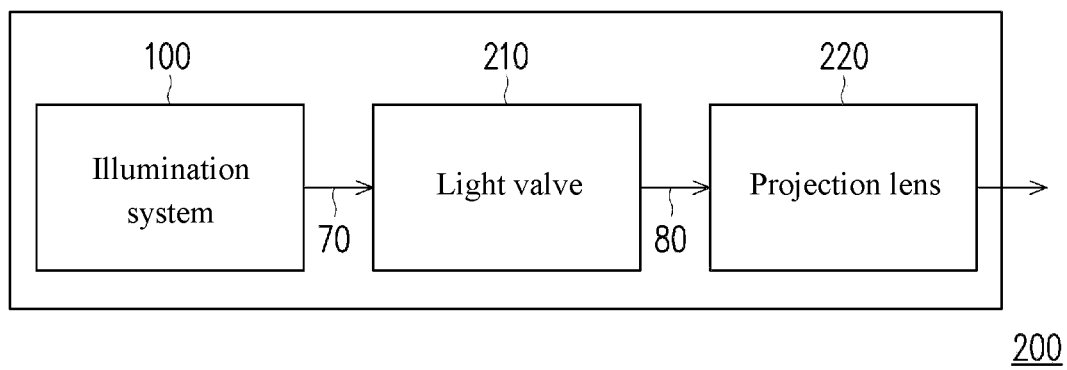
FIG. 1 is a block diagram of a projection device according to an embodiment of the disclosure.

FIG. 1 is a block diagram of a projection device according to an embodiment of the disclosure. Please referring to FIG. 1, a projection device 200 includes an illumination system 100, a light valve 210, and a projection lens 220. The illumination system 100 is configured to provide an illumination beam 70. The light valve 210 is disposed on a transmission path of the illumination beam 70 coming from the illumination system 100, and is configured to convert the illumination beam 70 into an image beam 80. The projection lens 220 is disposed on a transmission path of the image beam 80 and is configured to project the image beam 80 out of the projection device 200. In the embodiment, the number of the light valve 210 is one, but the disclosure is not limited thereto. In other embodiments, the number of the light valve 210 may be more than one. In addition, in the embodiment, the light valve 210 may be a digital micro-mirror device (DMD) or a liquid-crystal-on-silicon panel (LCOS panel). However, in other embodiments, the light valve 210 may be a transmissive liquid crystal panel or other beam modulators.

Figure 2A:
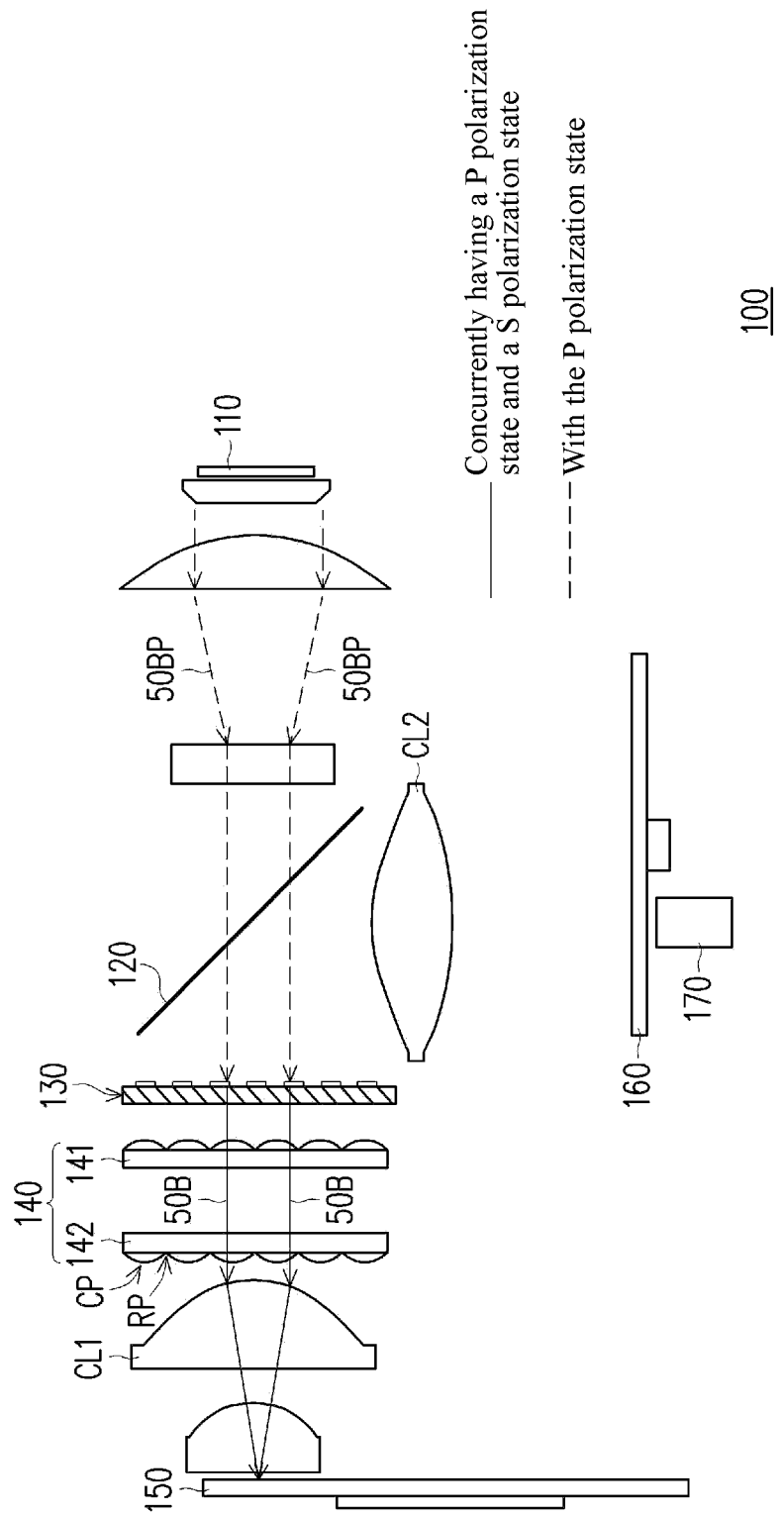
FIG. 2A is a structural schematic diagram of the illumination system and an optical path of a laser beam in FIG. 1.
Figure 2B:
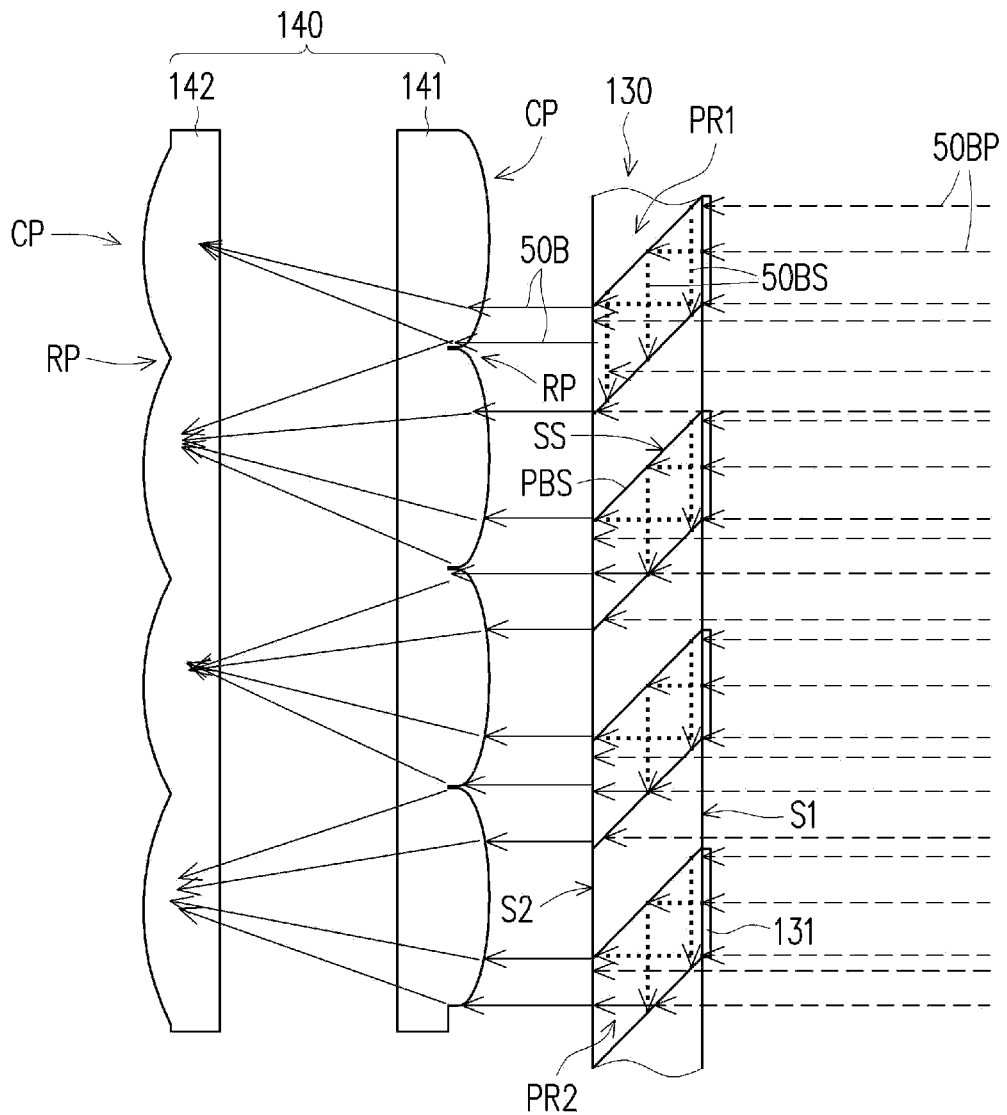
FIG. 2B is an enlarged schematic diagram of the optical path when the laser beam in FIG. 2A passes through a polarization conversion unit.
Figure 2C:
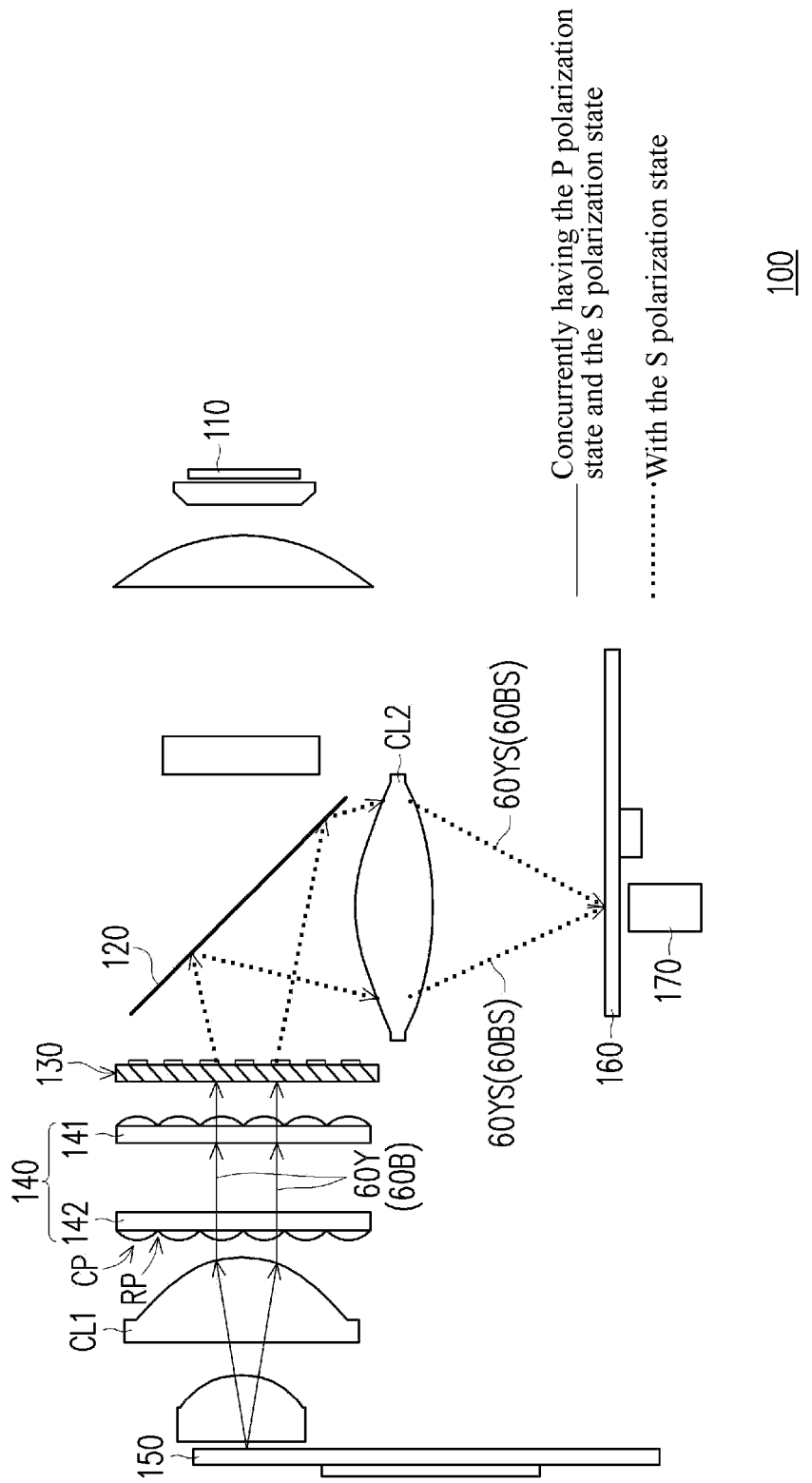
FIG. 2C is a schematic diagram of an optical path of a wavelength conversion beam of the illumination system in FIG. 2A.
Figure 2D:
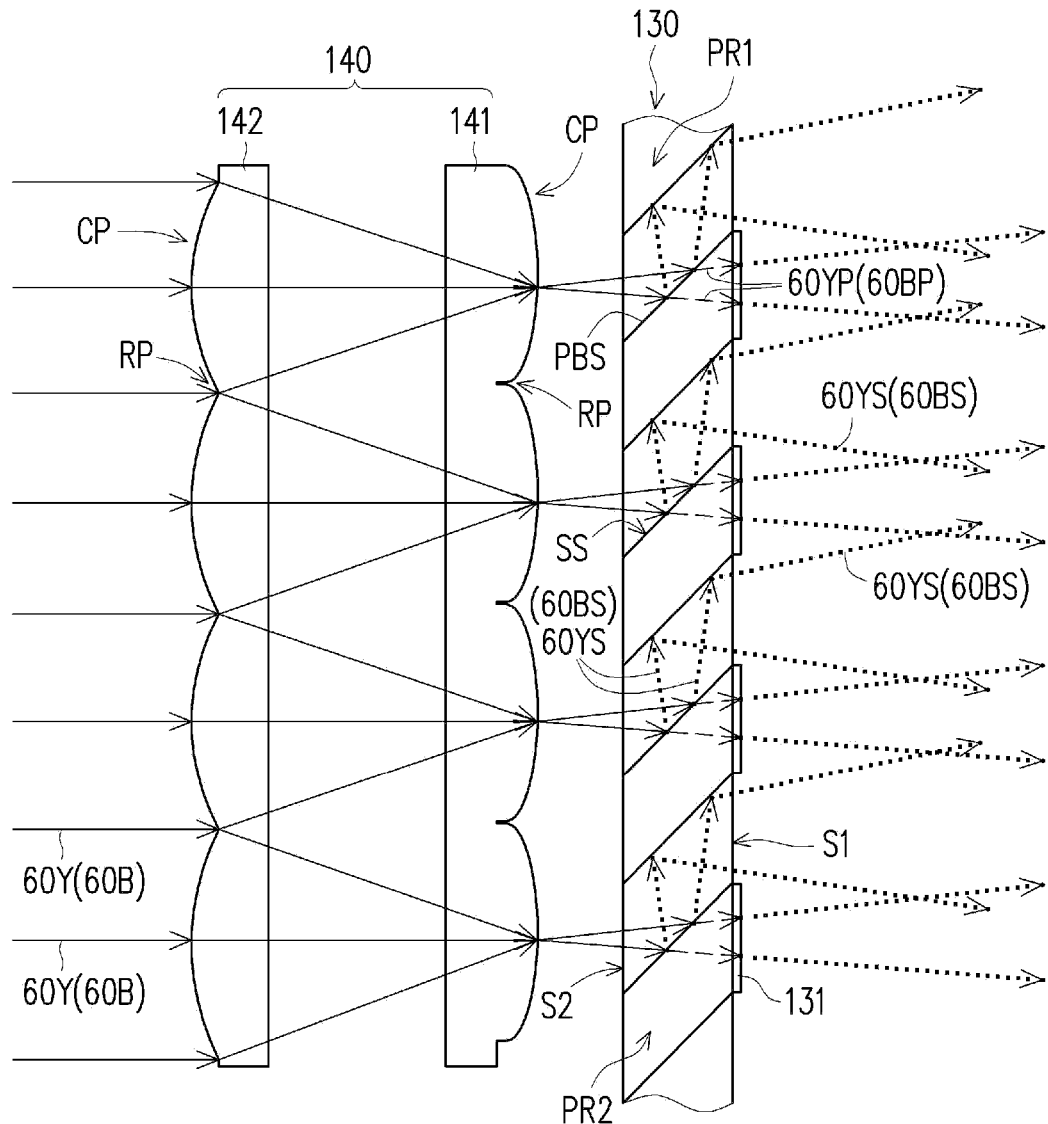
FIG. 2D is an enlarged schematic diagram of the optical path when the wavelength conversion beam in FIG. 2C passes through the polarization conversion unit.

FIG. 2A is a structural schematic diagram of the illumination system and an optical path of a laser beam in FIG. 1. FIG. 2B is an enlarged schematic diagram of the optical path when the laser beam in FIG. 2A passes through a polarization conversion unit. FIG. 2C is a schematic diagram of an optical path of a wavelength conversion beam of the illumination system in FIG. 2A. FIG. 2D is an enlarged schematic diagram of the optical path when the wavelength conversion beam in FIG. 2C passes through the polarization conversion unit. Specifically, as shown in FIGS. 2A and 2C, in the embodiment, the illumination system 100 is configured to provide the illumination beam 70, and the illumination system 100 includes a laser light source 110, a wavelength conversion module 150, and a polarization conversion unit 130. The laser light source 110 is configured to provide a laser beam 50BP. For example, in the embodiment, the laser light source 110 may include a plurality of blue laser diodes arranged in an array, and the laser beam 50BP is a blue laser beam, but the disclosure is not limited thereto.

As shown in FIGS. 2A and 2B, in the embodiment, the polarization conversion unit 130 is located between the wavelength conversion module 150 and the laser light source 110. The polarization conversion unit 130 has a plurality of first polarization conversion regions PR1 and a plurality of second polarization conversion regions PR2, and each of the first polarization conversion regions PR1 and each of the second polarization conversion regions PR2 are disposed in a staggered manner. In the embodiment, the polarization conversion unit 130 includes a plurality of phase delay sheets 131, which are correspondingly located on a plurality of surfaces facing the laser light source 110 and located in the plurality of second polarization conversion regions PR2 of the polarization conversion unit 130. In the embodiment, the laser beam 50BP emitted from the laser light source 110 is converted into a laser beam 50B concurrently having a first polarization state and a second polarization state by the polarization conversion unit 130 after incident on the polarization conversion unit 130.

As shown in FIGS. 2A and 2C, the wavelength conversion module 150 is deposed on a transmission path of the laser beam 50B. Specifically, in the embodiment, the wavelength conversion module 150 has a wavelength conversion region (not shown), and the laser beam 50B is converted into a wavelength conversion beam 60Y by the wavelength conversion region. Moreover, in the embodiment, the wavelength conversion beam 60Y includes a part having the first polarization state (for example, a wavelength conversion beam 60YP) and another part having the second polarization state (for example, a wavelength conversion beam 60YS). And as show in FIGS. 2C and 2D, in the embodiment, the wavelength conversion beam 60YS with the second polarization state leaves the polarization conversion unit 130 after passing through a surface of the polarization conversion unit 130 located in the plurality of first polarization conversion regions PR1 facing the laser light source 110, and the wavelength conversion beam 60YP with the first polarization state leaves the polarization conversion unit 130 after passing through the phase delay sheet 131 located in the second polarization conversion region PR2.

Specifically, as shown in FIGS. 2A and 2B, in the embodiment, polarization state of the laser beam 50BP emitted from the laser light source 110 is the first polarization state. For example, in the embodiment, the first polarization state is a horizontal polarization state (P polarization state), but the disclosure is not limited thereto. In another embodiment, the first polarization state may be a vertical polarization state (S polarization state). Furthermore, in the embodiment, the illumination system 100 further includes a polarized beam splitting sheet 120. As shown in FIGS. 2A and 2C, in the embodiment, the polarized beam splitting sheet 120 is located between the laser light source 110 and the polarization conversion unit 130. The polarized beam splitting sheet 120 is configured to allow the beam with the first polarization state to pass through and reflect the beam with the second polarization state. Specifically, in the embodiment, the first polarization state and the second polarization state are orthogonal to each other. For example, in the embodiment, the second polarization state is the vertical polarization state (the S polarization state) when the first polarization state is the horizontal polarization state (the P polarization state), but the disclosure is not limited thereto. In another embodiment, the second polarization state is the horizontal polarization state (the P polarization state) when the first polarization state is the vertical polarization state (the S polarization state). In this way, the laser beam 50BP emitted from the laser light source 110 may be transmitted to the polarization conversion unit 130 through the polarized beam splitting sheet 120.

As shown in FIG. 2A to FIG. 2D, furthermore, in the embodiment, the polarization conversion unit 130 has a first surface S1 and a second surface S2 opposite to each other. The first surface S1 faces the laser light source 110, and the second surface S2 faces the wavelength conversion module 150. Therefore, the plurality of phase delay sheets 131 included in the polarization conversion unit 130 are located on the first surface S1 of the polarization conversion unit 130 in the plurality of second polarization conversion regions PR2.

As shown in FIGS. 2B and 2D, in the embodiment, the polarization conversion unit 130 has plurality of polarized beam splitting films (PBS) within interior of the polarization conversion unit 130, which are correspondingly disposed on a plurality of polarized beam splitting surfaces SS. The plurality of polarized beam splitting surfaces SS are interfaces between the first polarization conversion regions PR1 and the second polarization conversion regions PR2 that are adjacent to each other. The polarized beam splitting film PBS is configured to allow the beam with the first polarization state to pass through and reflect the beam with the second polarization state. For example, a cross-sectional shape of the first polarization conversion region PR1 and the plurality of second polarization conversion regions PR2 is a parallelogram or a shape formed by two combined triangles. The polarized beam splitting surface SS is inclined with respect to the surface S1 and the second surface S2 of the polarization conversion unit 130, and the inclination angle is between 40 degrees and 50 degrees.

In addition, as shown in FIGS. 2A to 2D, in the embodiment, the illumination system 100 further includes a micro lens array 140, and the micro lens array 140 is located between the polarization conversion unit 130 and the wavelength conversion module 150. The micro lens array 140 has a plurality of convex portions CP and a plurality of recessed portions RP, and each of the recessed portions RP is configured to connect to two of the convex portions CP adjacent to it. For example, the micro lens array 140 includes two micro lens array sheets 141 and 142, and a convex portion CP of the micro lens array sheet 141 is aligned with a convex portion CP of the micro lens array sheet 142 to form the convex portion CP of the micro lens array 140. In addition, in the embodiment, the convex portion CP of the micro lens array sheet 141 protrudes toward the laser light source 110, and the convex portion CP of the micro lens array sheet 142 protrudes toward the wavelength conversion module 150. On the other hand, a recessed portion RP of the micro lens array sheet 141 is aligned with a recessed portion RP of the micro lens array sheet 142 to form the recessed portion RP of the micro lens array 140. In more detail, as shown in FIGS. 2B and 2D, in the embodiment, a central optical axis of each of the convex portions CP of the micro lens array 140 respectively passes through each of the phase delay sheet 131, and is aligned with the second surface S2 of the first polarization conversion region PR1 not disposed with the phase delay sheet 131 and the first surface S1 of the second polarization conversion region PR2 disposed with the phase delay sheet 131.

In this way, as shown in FIGS. 2A and 2B, in the embodiment, when the laser beam 50BP emitted from the laser light source 110 is incident on the polarization conversion unit 130, the polarization state of the laser beam 50BP incident on the plurality of second polarization conversion regions PR2 is transformed to the second polarization state after passing through the phase delay sheet 131 and a laser beam 50BS with the second polarization state is formed. The laser beam 50BS leaves through the second surface S2 of the polarization conversion unit 130 after the laser beam 50BS is reflected by the polarized beam splitting film PBS. On the other hand, the polarization state of the laser beam 50BP incident on the plurality of first polarization conversion regions PR1 does not pass through the phase delay sheet 131, therefore the polarization state of the laser beam 50BP may still be the first polarization state after leaving the second surface S2 of the polarization conversion unit 130. That is, as shown in FIG. 2B, in the embodiment, the laser beam 50BP incident on the plurality of second polarization conversion regions PR2 from the first surface S1 of the polarization conversion unit 130 is transformed to the laser beam 50BS with the second polarization state after leaving the second surface S2 of the polarization conversion unit 130, and the polarization state of the laser beam 50BP incident on the plurality of first polarization conversion regions PR1 from the first surface S1 of the polarization conversion unit 130 is still the first polarization state after leaving the second surface S2 of the polarization conversion unit 130. Therefore, the laser beam 50BP and the laser beam 50BS after leaving the polarization conversion unit 130 may form the laser beam 50B concurrently having the first polarization state and the second polarization state. That is, the laser beam 50B at this time includes the laser beam 50BP and the laser beam 50BS.

In addition, as shown in FIGS. 2A and 2B, the laser beam 50B concurrently having the first polarization state and the second polarization state is incident on the convex portion CP and the recessed portion RP of the micro lens array sheet 141 of the micro lens array 140 at the same time, and is uniformly emitted from the convex portion CP of the micro lens array sheet 142 of the micro lens array 140 and transmitted to a subsequent optical element.

Furthermore, as shown in FIGS. 2A to 2D, the illumination system 100 further includes a first focusing lens CL1. The first focusing lens CL1 is located between the micro lens array 140 and the wavelength conversion module 150, to enable the laser beam 50B coming from the micro lens array 140 to converge at the wavelength conversion module 150. Specifically, in the embodiment, the wavelength conversion module 150 further includes a non-conversion region (not shown), and the wavelength conversion module 150 is configured to rotate around an axis of rotation, to enable the wavelength conversion region and the non-conversion region to be alternately on the transmission path of the laser beam 50B. The laser beam 50B is reflected by the non-conversion region to form a laser beam 60B when the non-conversion region is on the transmission path of the laser beam 50B, and the laser beam 50B is converted into a wavelength conversion beam 60Y by the wavelength conversion region when the wavelength conversion region is on the transmission path of the laser beam 50B. In addition, since the laser beam 50B incident on the wavelength conversion module 150 includes a part (for example, the laser beam 50BP) with the first polarization state and the another part (for example, the laser beam 50BS) with the second polarization state, a part of the laser beam 60B incident through the second surface S2 of the polarization conversion unit 130 after leaving the wavelength conversion module 150 includes a part with the first polarization state and another part with the second polarization state. Moreover, in the embodiment, the wavelength conversion beam 60Y includes a part with the first polarization state and another part with the second polarization state. That is, the wavelength conversion beam 60Y at this time includes the wavelength conversion beam 60YP and the wavelength conversion beam 60YS.

Next, as shown in FIGS. 2C and 2D, in the embodiment, the laser beam 60B and the wavelength conversion beam 60Y coming from the wavelength conversion module 150 are incident on the polarization conversion unit 130 after being converged by the convex portion CP of the micro lens array 140. Since the central optical axis of each of the convex portions CP respectively passes through each of the phase delay sheets 131 and is opposite to the second surface S2 located in the first polarization conversion region PR1, the wavelength conversion beam 60Y is incident on the polarization conversion unit 130 from the second surface S2 of the polarization conversion unit 130 located in the polarization conversion region PR1. Furthermore, as shown in FIG. 2D, in the embodiment, the wavelength conversion beam 60YS with the second polarization state leaves the polarization conversion unit 130 through the first surface S1 (that is, the surface facing the laser light source 110) located in the first polarization conversion region PR1 after being reflected by the polarized beam splitting film PBS, and the wavelength conversion beam 60YP with the first polarization state leaves the polarization conversion unit 130 after sequentially passing through the polarized beam splitting film PBS and the phase delay sheet 131 located in the second polarization conversion region PR2, when the wavelength conversion beam 60Y concurrently having the first polarization state and the second polarization state passes through the second surface S2 and is incident on the polarized beam splitting film PBS of the polarization conversion unit 130. In addition, since the wavelength conversion beam 60YP with the first polarization state leaves the polarization conversion unit 130 through the phase delay sheet 131 located in the second polarization conversion region PR2, the first polarization state of the wavelength conversion beams 60YP is transformed to the second polarization state after passing through the phase delay sheet 131 to form the wavelength conversion beam 60YS with the second polarization state. In other words, the polarization state of the wavelength conversion beam 60YS with the second polarization state and incident from the second surface S2 of the polarization conversion unit 130 is still the second polarization state after leaving the polarization conversion unit 130, and the wavelength conversion beam 60YP with the first polarization state and incident from the surface S2 of the polarization conversion unit 130 is transformed to the wavelength conversion beam 60YS with the second polarization state after leaving the first surface S1 of the polarization conversion unit 130.

On the other hand, since a part of the laser beam 60B leaving the wavelength conversion module 150 includes the part with the first polarization state and the another part with the second polarization state, a change in an optical path of the laser beam 60B incident from the second surface S2 of the polarization conversion unit 130 in the polarization conversion unit 130 is same as a change in an optical path of the wavelength conversion beam 60Y in the polarization conversion unit 130, which may not be repeated here. That is to say, as shown in FIGS. 2C and 2D, in the embodiment, the polarization state of a laser beam 60BS with the second polarization state and incident from the second surface S2 of the polarization conversion unit 130 is still the second polarization state after leaving the polarization conversion unit 130. The polarization state of a laser beam 60BP with the first polarization state and incident from the second surface S2 of the polarization conversion unit 130 is transformed to the laser beam 60BS with the second polarization state after passing through the phase delay sheet 131 located in the second polarization conversion region PR2, and the laser beam 60BS leaves from the first surface S1 of the polarization conversion unit 130.

Next, as shown in FIG. 2C, the illumination system 100 may further include a second focusing lens CL2 and a filter module 160. The second focusing lens CL2 is located between the polarized beam splitting sheet 120 and the filter module 160. In the embodiment, since the polarized beam splitting sheet 120 may be configured to reflect the beam with the second polarization state, the wavelength conversion beam 60YS and the laser beam 60BS with the second polarization state emitted from the first surface S1 of the polarization conversion unit 130 is reflected by the polarized beam splitting sheet 120 to the subsequent second focusing lens CL2, so that the wavelength conversion beam 60YS and the laser beam 60BS is symmetrically incident on the filter module 160 through the second focusing lens CL2. In addition, in the embodiment, a surface of the polarized beam splitting sheet 120 facing the wavelength conversion module 150 may be coated with a beam splitting film or a polarized beam splitting film, which is configured to reflect beams with a specific light-emitting wavelength range. Here, the specific light-emitting wavelength range refers to light-emitting waveband range of the wavelength conversion beam 60YS, thus, light utilization efficiency of the wavelength conversion beam 60YS can be further improved.

Next, as shown in FIG. 2C, in the embodiment, the filter module 160 is deposed on transmission paths of the laser beam 60BS and the wavelength conversion beam 60YS, and the filter module 160 has an optical filter region (not shown) and a translucent region (not shown). The filter module 160 includes an actuator (not shown), which is configured to enable the optical filter optical region (not shown) to correspondingly enter an irradiation range of the wavelength conversion beam 60YS at different timings, so as to respectively form different colored lights, such as a red color light and a green color light. On the other hand, the translucent region (not shown) correspondingly enters the irradiation range of the laser beam 60BS being transmitted to the filter module 160 at different timings to form a blue color light. In this way, the laser beam 60BS and the wavelength conversion beam 60YS are enabled to sequentially form the illumination beam 70 with different colors.

On the other hand, as shown in FIGS. 2A and 2C, in the embodiment, the projection device 200 may selectively include a light homogenizing element 170, which is deposed on the transmission path of the illumination beam 70 formed after passing through the filter module 160. In the embodiment, the light homogenizing element 170 includes, for example, an integrating rod, but the disclosure is not limited thereto. In more detail, as shown in FIG. 2C, the light homogenizing element 170 may homogenize the laser beam 60BS and the wavelength conversion beam 60YS in the illumination beam 70 and transmit them to the light valve 210 (shown in FIG. 1) when the laser beam 60BS and the wavelength conversion beam 60YS in the illumination beam 70 are transmitted to the light homogenizing element 170. However, the disclosure is not limited thereto. Since the micro lens array 140 that may make light uniform is already disposed on the paths of the laser beam 60B and the wavelength conversion beam 60Y coming from the wavelength conversion module 150, in another embodiment, the light homogenizing element 170 may be omitted, thereby reducing the size of the projection device 200.

As a result, the illumination system 100 and the projection device 200 may enable the laser beam 50BP provided by the laser light source 110 to be incident on the polarized beam splitting sheet 120 and the subsequent optical elements in a forward direction through the disposition of the polarization conversion unit 130, thereby increasing options in the disposition positions of the light source. In addition, since the micro lens array 140 is disposed on the paths of the laser beam 60B and the wavelength conversion beam 60Y of the illumination system 100 and the projection device 200, the size of the projection device 200 can be reduced while the laser beam 60B and the wavelength conversion beam 60Y are homogenized concurrently. In addition, in the embodiment, the transmission paths of the laser beam 50B and the wavelength conversion beam 60Y after being emitted from the wavelength conversion module 150 are exactly the same. In this way, the overall uniformity of the illumination beam 70 and the image frame can be improved.

It should be noted that, in the foregoing embodiment, although as an example, the micro lens array 140 includes the two micro lens array sheets 141 and 142 aligned with each other, the disclosure is not limited thereto. In other embodiments, the micro lens array 140 may be a single micro lens array sheet, which may be described in detail in conjunction with FIGS. 3A to 3D as follows.

Figure 3A:
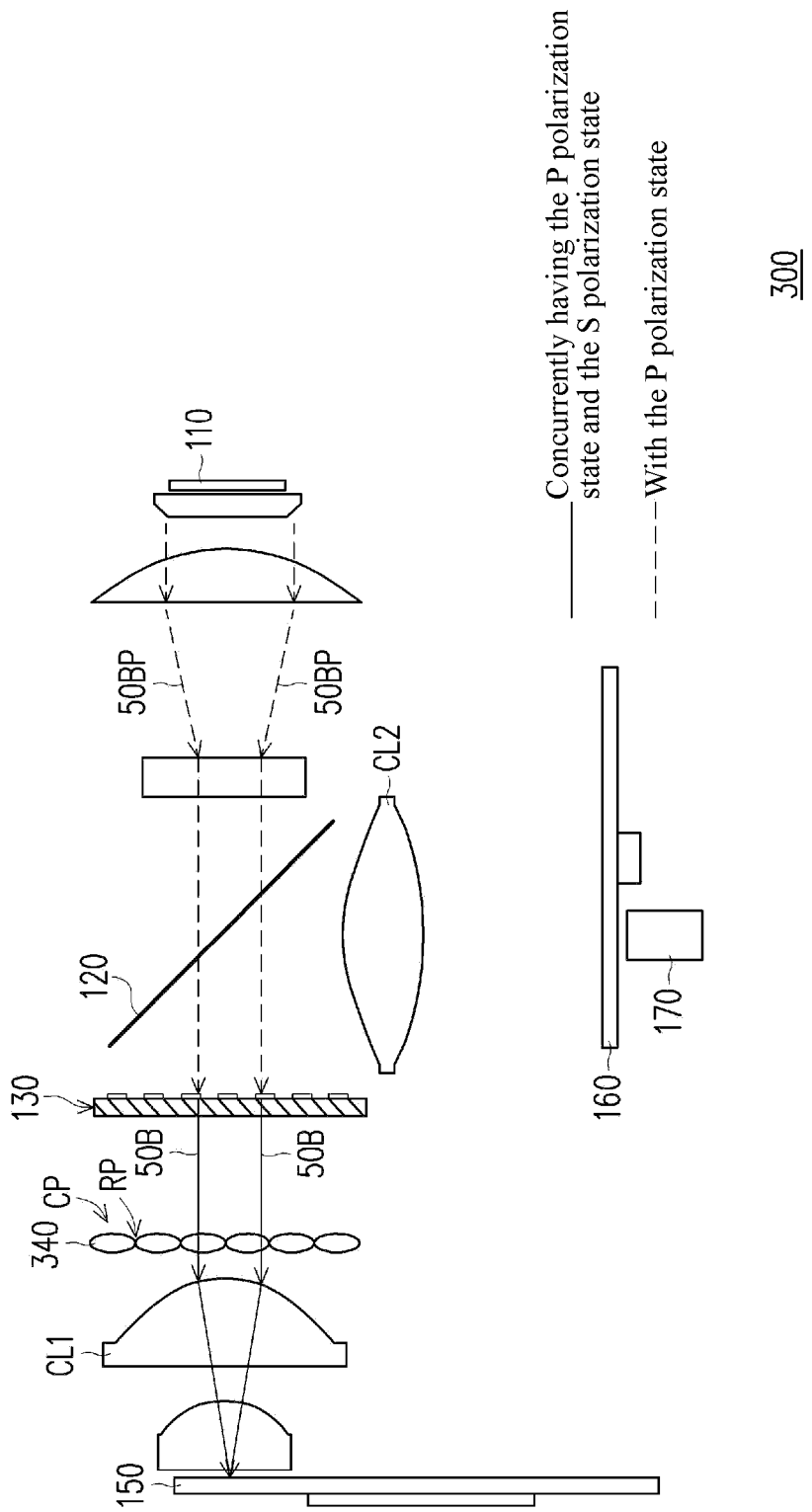
FIG. 3A is a structural schematic diagram of another illumination system and the optical path of the laser beam in FIG. 1.
Figure 3B:
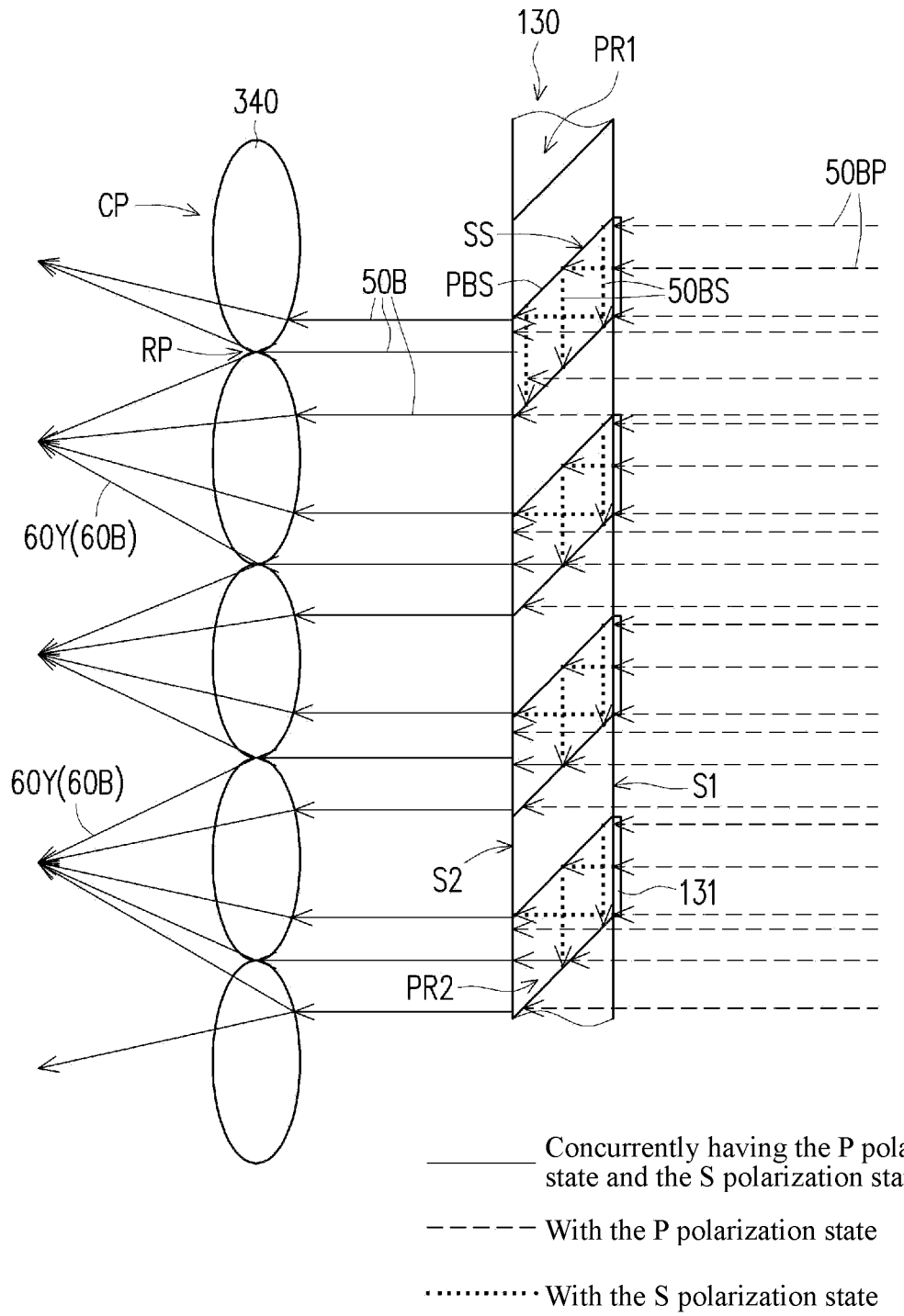
FIG. 3B is an enlarged schematic diagram of the optical path when the laser beam in FIG. 3A passes through the polarization conversion unit.
Figure 3C:
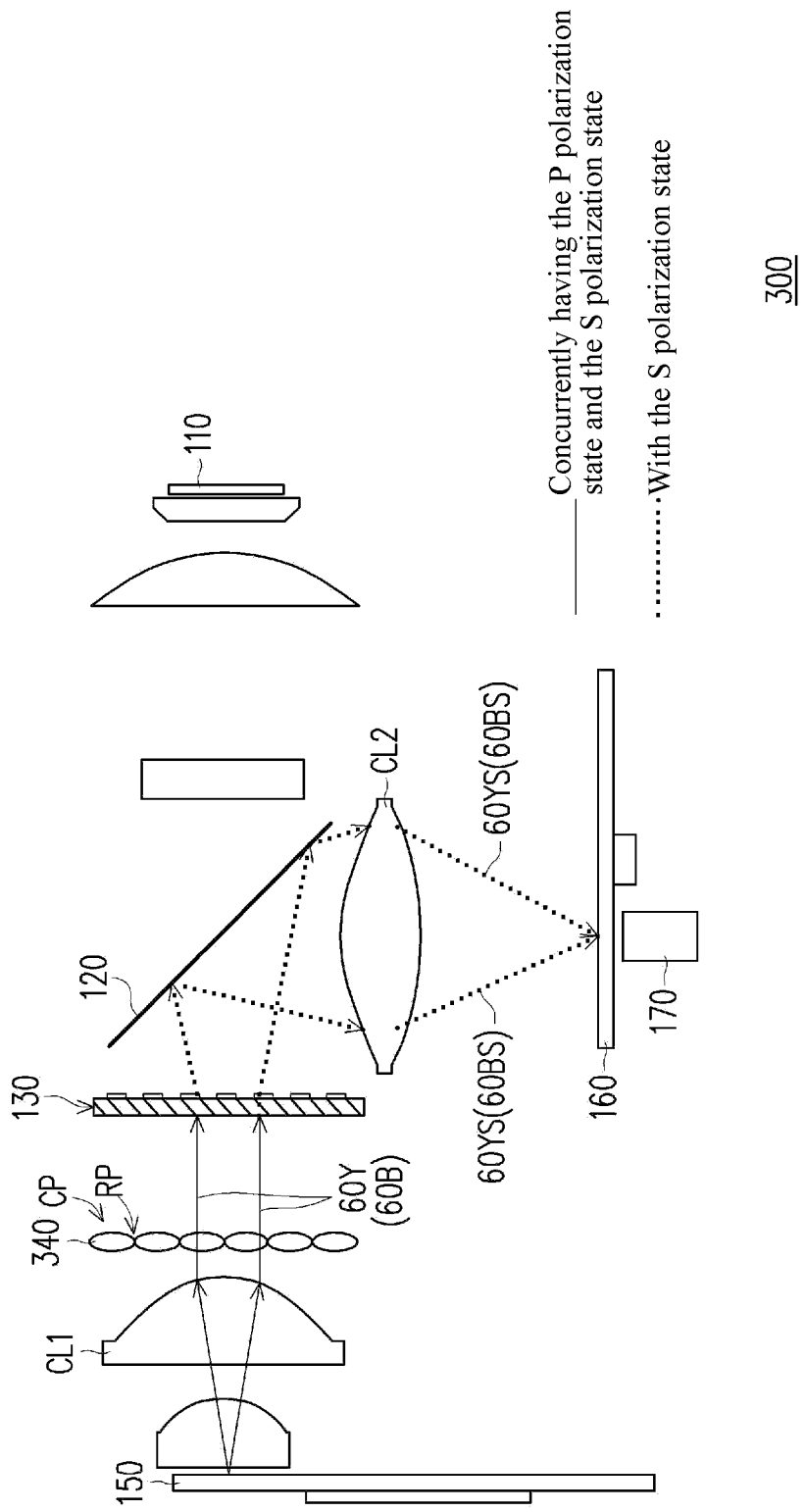
FIG. 3C is a schematic diagram of the optical path of the wavelength conversion beam of the illumination system in FIG. 3A.
Figure 3D:
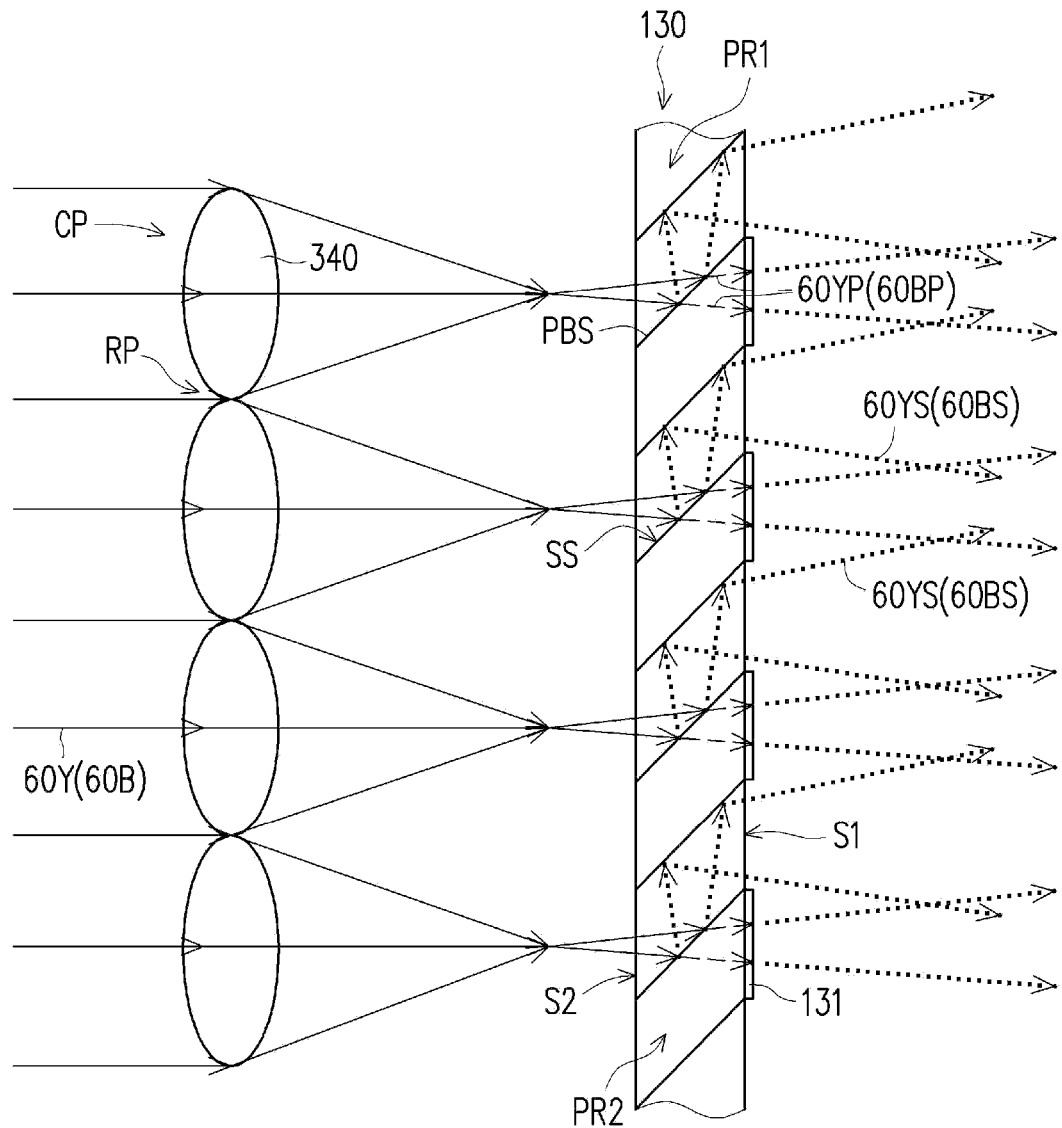
FIG. 3D is an enlarged schematic diagram of the optical path when the wavelength conversion beam in FIG. 3C passes through the polarization conversion unit.

FIG. 3A is a structural schematic diagram of another illumination system and the optical path of the laser beam in FIG. 1. FIG. 3B is an enlarged schematic diagram of the optical path when the laser beam in FIG. 3A passes through the polarization conversion unit. FIG. 3C is a schematic diagram of the optical path of the wavelength conversion beam of the illumination system in FIG. 3A. FIG. 3D is an enlarged schematic diagram of the optical path when the wavelength conversion beam in FIG. 3C passes through the polarization conversion unit. Please referring to FIGS. 3A to 3D, an illumination system 300 in FIG. 3A is similar to the illumination system 100 in FIG. 2A, except for the following difference. As shown in FIGS. 3A to 3D, in the embodiment, a body of the micro lens array 340 is in a form of a single micro lens array sheet, and the micro lens array 340 has the plurality of convex portions CP and the plurality of recessed portions RP, each of the recessed portions RP is configured to connect to the two adjacent convex portions CP, and the plurality of convex portions CP of the micro lens array 340 respectively protrude toward the laser light source 110 and the wavelength conversion module 150. The central optical axis of each of the convex portions CP of the micro lens array 340 respectively passes through each of the phase delay sheets 131, and alignment of each of the convex portions CP of the micro lens array 340 and each of the recessed portions RP with the other optical elements in the illumination system 300 is similar to that of the micro lens array 140 of the illumination system 100 in FIG. 2A, which may not be repeated here. In addition, in the embodiment, transmission paths and a process of changing the polarization state of the laser beams 50BP, 50B, 50BS, 60BP, 60B, 60BS and the wavelength conversion beams 60Y, 60YP, 60YS are same as the transmission paths and the process of changing the polarization state of the laser beams 50BP, 50B, 50BS, 60BP, 60B, 60BS, and the wavelength conversion beam 60Y, 60YP, and 60YS in FIG. 2A, which may not be repeated here.

As a result, the illumination system 300 is able to provide advantages similar to the illumination system 100 through the disposition of the micro lens array 340 and the polarization conversion unit 130, which may not be repeated here. Moreover, when the illumination system 300 is applied to the projection device 200 in FIG. 1, the projection device 200 is also able to provide the advantages, which may not be repeated here.

On the other hand, in the foregoing embodiment, although the polarized beam splitting film PBS of the polarization conversion unit 130 is shown as an example that enables the penetration of the beam with the same polarization state as the laser beam emitted from the laser light source 110, the disclosure is not limited thereto. In other embodiments, the polarized beam splitting film PBS of the polarization conversion unit 130 may reflect the beam with the same polarization state as that of the laser beam emitted from the laser light source 110, and allow a beam that is orthogonal to the polarization state of the laser beam emitted from the laser light source 110 to penetrate, which may be described in detail in conjunction with FIGSs. 4A to 4D as follows.

Figure 4A:
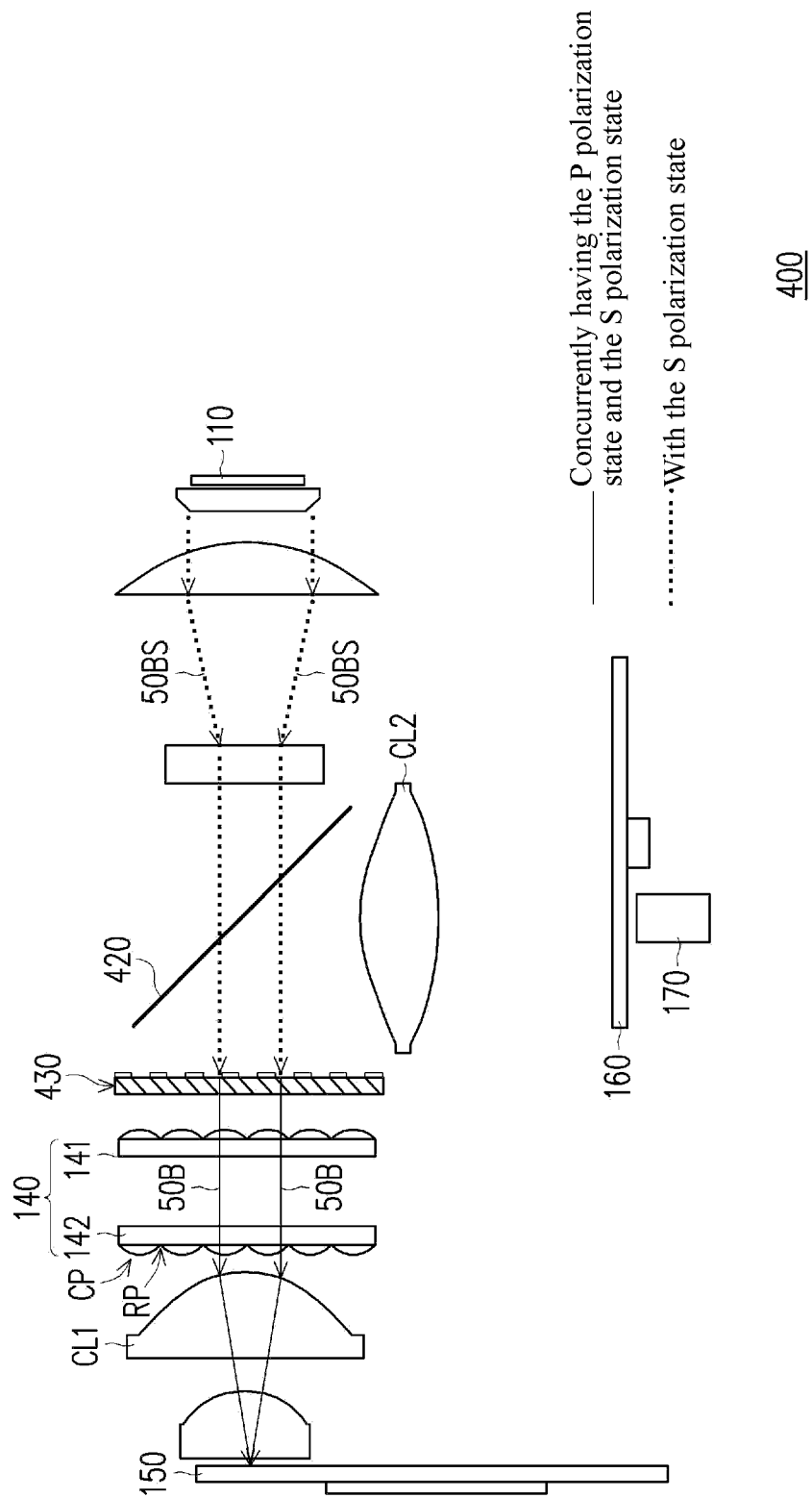
FIG. 4A is a structural schematic diagram of another illumination system and the optical path of the laser beam in FIG. 1.
Figure 4B:
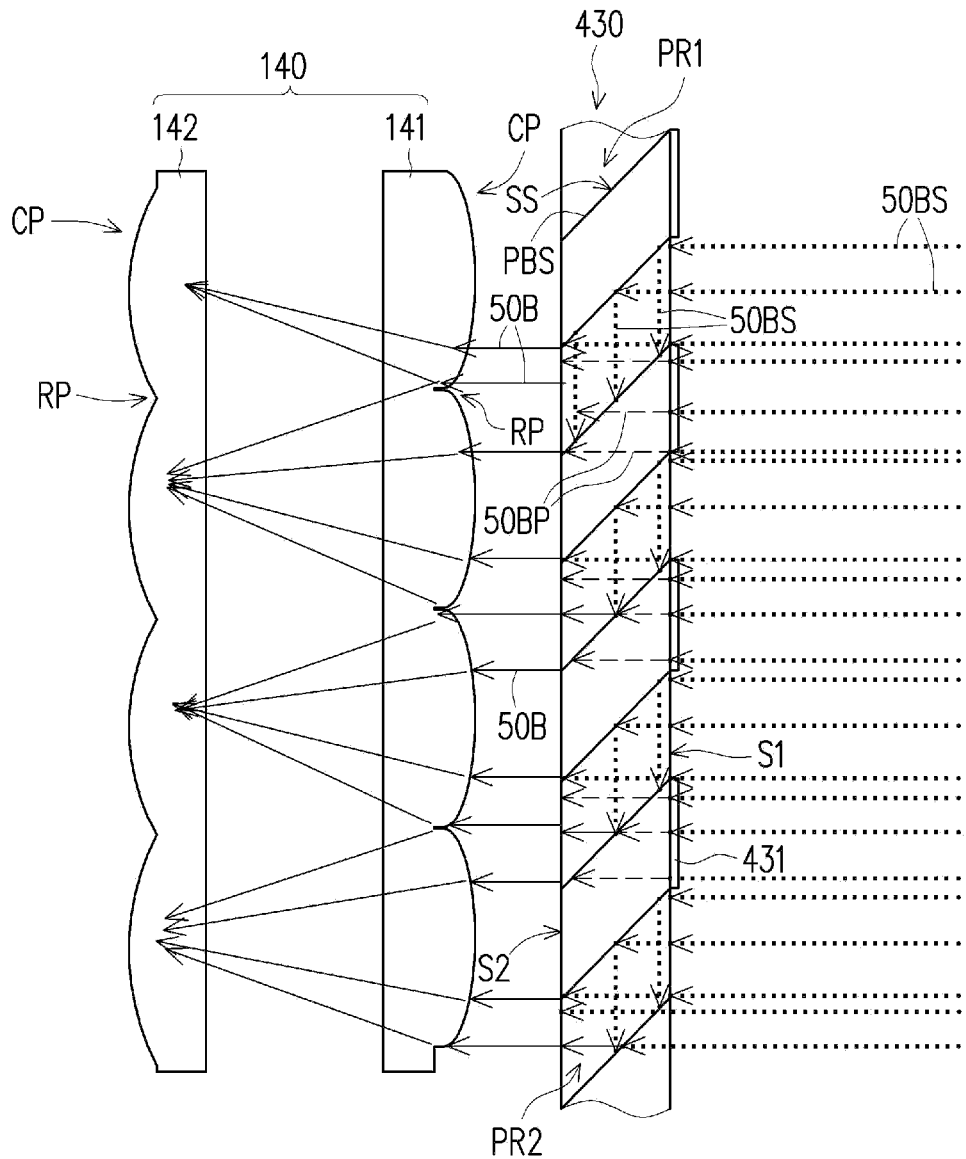
FIG. 4B is an enlarged schematic diagram of the optical path when the laser beam in FIG. 4A passes through a polarization conversion unit.
Figure 4C:
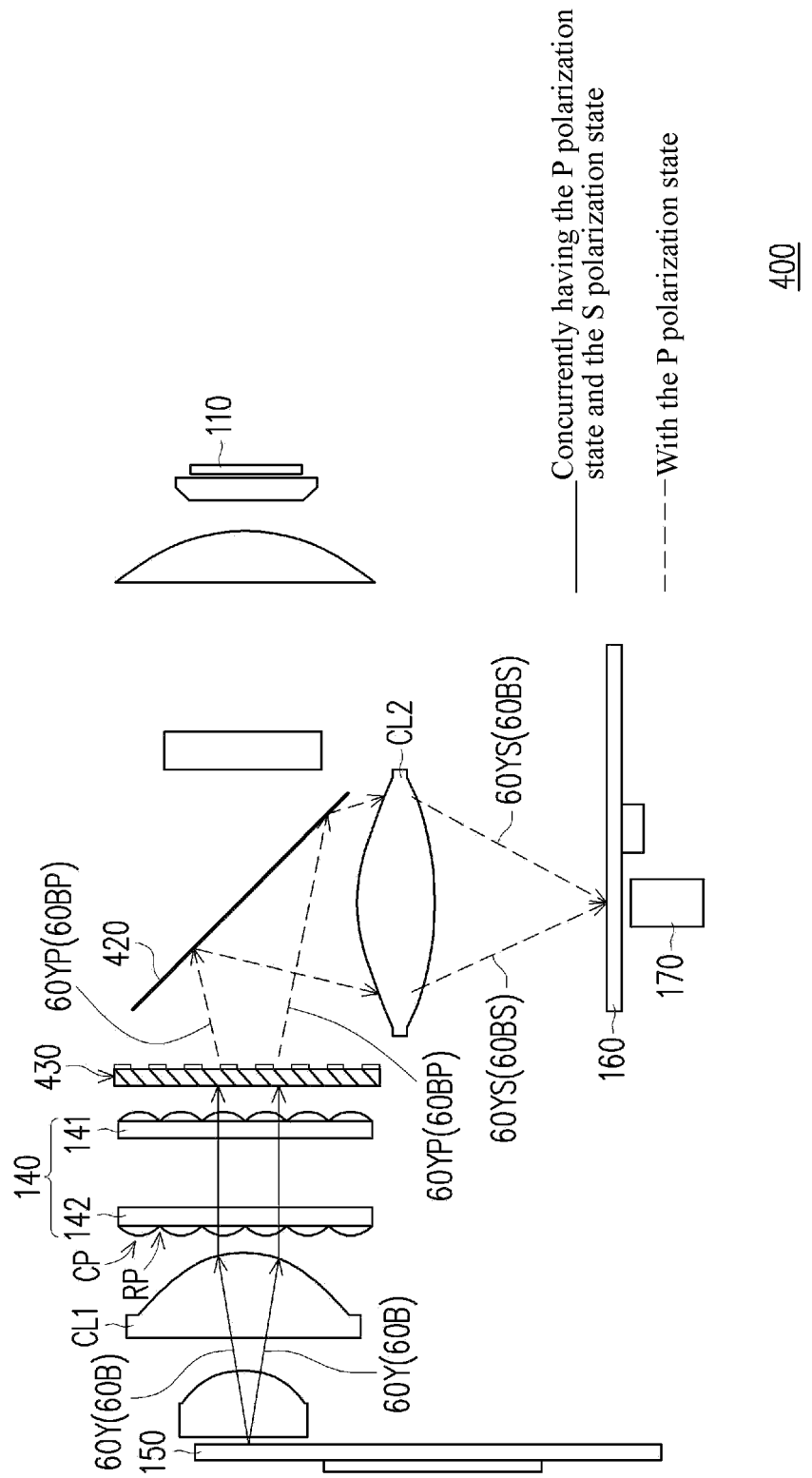
FIG. 4C is a schematic diagram of the optical path of the wavelength conversion beam of the illumination system in FIG. 4A.
Figure 4D:
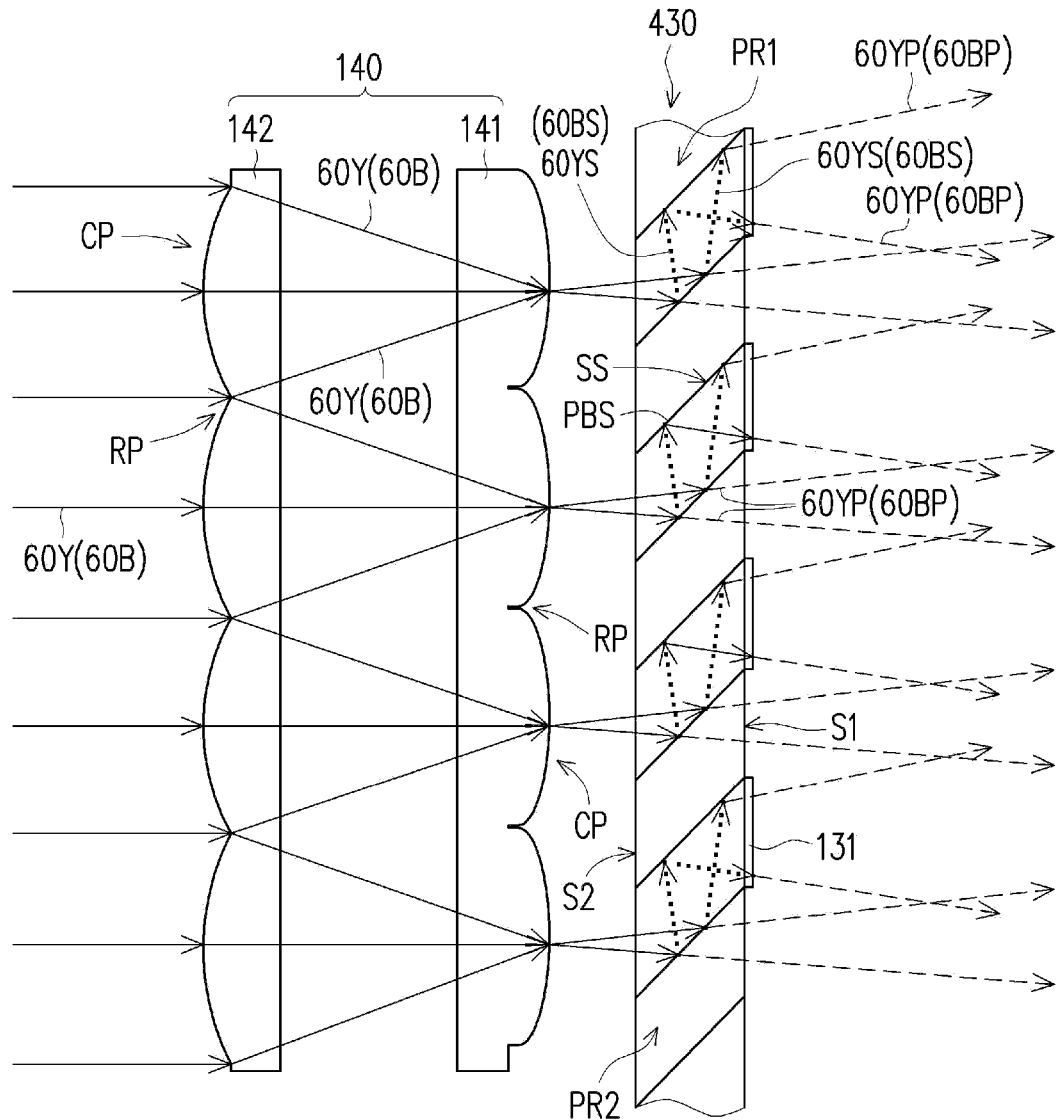
FIG. 4D is an enlarged schematic diagram of the optical path when the wavelength conversion beam in FIG. 4C passes through the polarization conversion unit.

FIG. 4A is a structural schematic diagram of another illumination system and the optical path of the laser beam in FIG. 1. FIG. 4B is an enlarged schematic diagram of the optical path when the laser beam in FIG. 4A passes through a polarization conversion unit. FIG. 4C is a schematic diagram of the optical path of the wavelength conversion beam of the illumination system in FIG. 4A. FIG. 4D is an enlarged schematic diagram of the optical path when the wavelength conversion beam in FIG. 4C passes through the polarization conversion unit. Please referring to FIGS. 4A to 4D, an illumination system 400 in FIG. 4A is similar to the illumination system 100 in FIG. 2A, except for the following differences. As shown in FIG. 4A, in the embodiment, the polarization state of the laser beam 50BS emitted from the laser light source 110 is the first polarization state, and the polarized beam splitting film PBS of a polarization conversion unit 430 is configured to allow the beam with the second polarization state to pass through and reflect the beam with the first polarization state. For example, the first polarization state of the embodiment is the vertical polarization state (the S polarization state), and the second polarization state is the horizontal polarization state (the P polarization state). In addition, as shown in FIGS. 4A to 4D, in the embodiment, the central optical axis of each of the convex portions CP of the micro lens array 140 are respectively exempted from passing through each phase delay sheet 431, and aligned with the second surface S2 of the second polarization conversion region PR2 disposed with the phase delay sheets 431 and the first surface S1 of the first polarization conversion region PR1 not disposed with the phase delay sheets 431. That is to say, in the embodiment, alignment of the central optical axis of each of the convex portions CP of the micro lens array 140 and the first polarization conversion regions PR1 and the second polarization conversion regions PR2 of the polarization conversion unit 430 is different from the illumination system 100 in FIG. 2A, and results in a shift.

In this way, as shown in FIG. 4B, in the embodiment, the polarization state of the laser beam 50BS incident on the plurality of second polarization conversion regions PR2 is transformed to the second polarization state to form the laser beam 50BP with the second polarization state after passing through the phase delay sheet 431 when the laser beam 50BS emitted from the laser light source 110 is incident on the polarization conversion unit 430. The laser beam 50BP with the second polarization state is reflected by the polarized beam splitting film PBS and leaves through the second surface S2 of the polarization conversion unit 430. On the other hand, since the laser beam 50BS incident on the plurality of first polarization conversion regions PR1 does not pass through the phase delay sheet 431, the polarization state of the laser beam 50BS may still be the first polarization state after leaving the second surface S2 of the polarization conversion unit 430. That is, as shown in FIG. 4B, in the embodiment, the laser beam 50BS incident on the plurality of second polarization conversion regions PR2 from the first surface S1 of the polarization conversion unit 430 is transformed to the laser beam 50BP with the second polarization state after leaving through the second surface S2 of the polarization conversion unit 430. The polarization state of the laser beam 50BS incident on the plurality of first polarization conversion regions PR1 from the first surface S1 of the polarization conversion unit 430 is still the first polarization state after leaving through the second surface S2 of the polarization conversion unit 430. Therefore, the laser beam 50BP and the laser beam 50BS leaving the polarization conversion unit 430 may form the laser beam 50B concurrently having the first polarization state and the second polarization state. That is, the laser beam 50B at this time includes the laser beam 50BP and the laser beam 50BS.

On the other hand, as shown in FIGS. 4C and 4D, in the embodiment, the laser beam 50B and the wavelength conversion beam 60Y coming from the wavelength conversion module 150 are incident on the polarization conversion unit 430 after being converged by the convex portion CP of the micro lens array 140. Since the central optical axis of each of the convex portions CP is exempted from passing through each of the phase delay sheets 431, and is opposite to the second surface S2 located in the second polarization conversion region PR2, the wavelength conversion beam 60Y may be incident on the polarization conversion unit 430 from the second surface S2 of the polarization conversion unit 430 located in the second polarization conversion region PR2. Furthermore, as shown in FIG. 4D, in the embodiment, the wavelength conversion beam 60YS with the first polarization state leaves the polarization conversion unit 430 after being reflected by the polarized beam splitting film PBS to pass through the phase delay sheet 431 located in the second polarization conversion region PR2 when the wavelength conversion beam 60Y concurrently having the first polarization state and the second polarization state passes through the second surface S2 located in the second polarization conversion region PR2, and is incident on the polarized beam splitting film PBS of the polarization conversion unit 430. In addition, since the wavelength conversion beam 60YS with the first polarization state leaves the polarization conversion unit 430 through the phase delay sheet 431 located in the second polarization conversion region PR2, the first polarization state of the wavelength conversion beams 60YS is transformed to the second polarization state after passing through the phase delay sheet 431 to form the wavelength conversion beam 60YP with the second polarization state. The wavelength conversion beam 60YP with the second polarization state sequentially passes through the polarized beam splitting film PBS and leaves the polarization conversion unit 430 through the first surface S1 (that is, the surface facing the laser light source 110) located in the first polarization conversion region PR1. In other words, the polarization state of the wavelength conversion beam 60YP with the second polarization state and incident from the second surface S2 of the polarization conversion unit 430 is still the second polarization state after leaving the polarization conversion unit 430, and the wavelength conversion beam 60YS with the first polarization state and incident from the surface S2 is transformed to the wavelength conversion beam 60YP with the second polarization state after leaving the first surface S1 of the polarization conversion unit 430.

On the other hand, since a part of the laser beam 60B leaving the wavelength conversion module 150 includes the part with the first polarization state and the another part with the second polarization state, a change in an optical path of the laser beam 60B incident from the second surface S2 of the polarization conversion unit 430 in the polarization conversion unit 430 is same as a change in an optical path of the wavelength conversion beam 60Y in the polarization conversion unit 430, which may not be repeated here. That is to say, as shown in FIGS. 4C and 4D, in the embodiment, the polarization state of the laser beam 60BP with the second polarization state and incident from the second surface S2 of the polarization conversion unit 130 is still the second polarization state after leaving the polarization conversion unit 130. The polarization state of the laser beam 60BS with the first polarization state and incident from the second surface S2 of the polarization conversion unit 130 is transformed to the laser beam 60BP with the second polarization state after passing through the phase delay sheet 131 located in the second polarization conversion region PR2, and the laser beam 60BP leaves from the first surface S1 of the polarization conversion unit 430.

Moreover, in the embodiment, although the second polarization state is the horizontal polarization state (the P polarization state), a polarized beam splitting sheet 420 may be configured to reflect the beam with the second polarization state. Therefore, the wavelength conversion beam 60YP and the laser beam 60BP may be reflected by the polarized beam splitting sheet 420 to the subsequent optical elements to form the illumination beam 70 after passing through the polarization conversion unit 130.

As a result, the illumination system 400 may increase the options in the disposition positions of the light source, reduce the size of the device, and improve the overall uniformity of the illumination beam 70 and the image frame through disposition and alignment of the polarization conversion unit 430 and the micro lens array 140, thereby providing the advantages similar to the illumination system 100, which may not be repeated here. Moreover, when the illumination system 400 is applied to the projection device 200 in FIG. 1, the projection device 200 is also able to provide the advantages, which may not be repeated here.

Figure 5A:
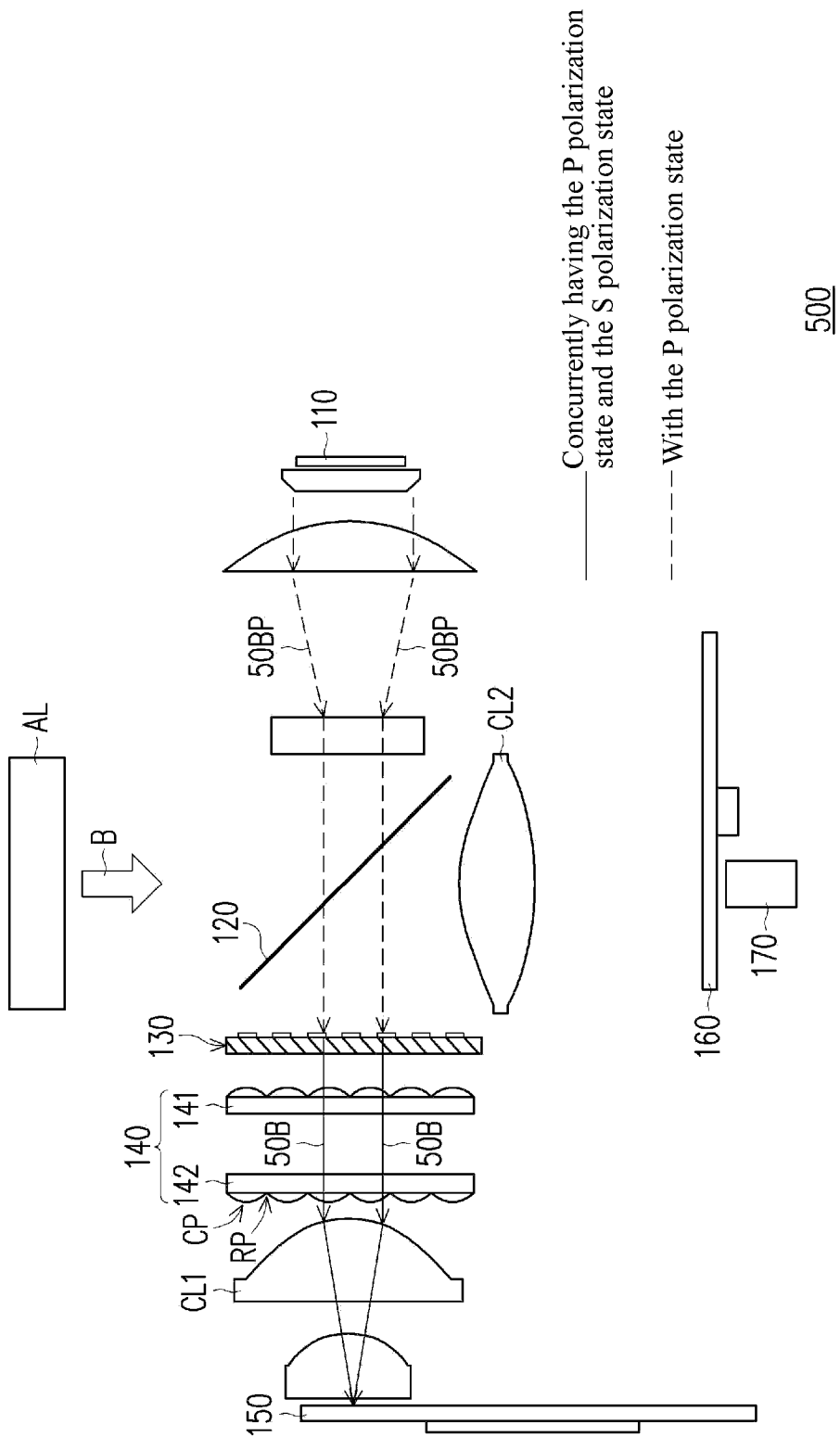
FIG. 5A is a structural schematic diagram of another illumination system and the optical path of the laser beam in FIG. 1.
Figure 5B:
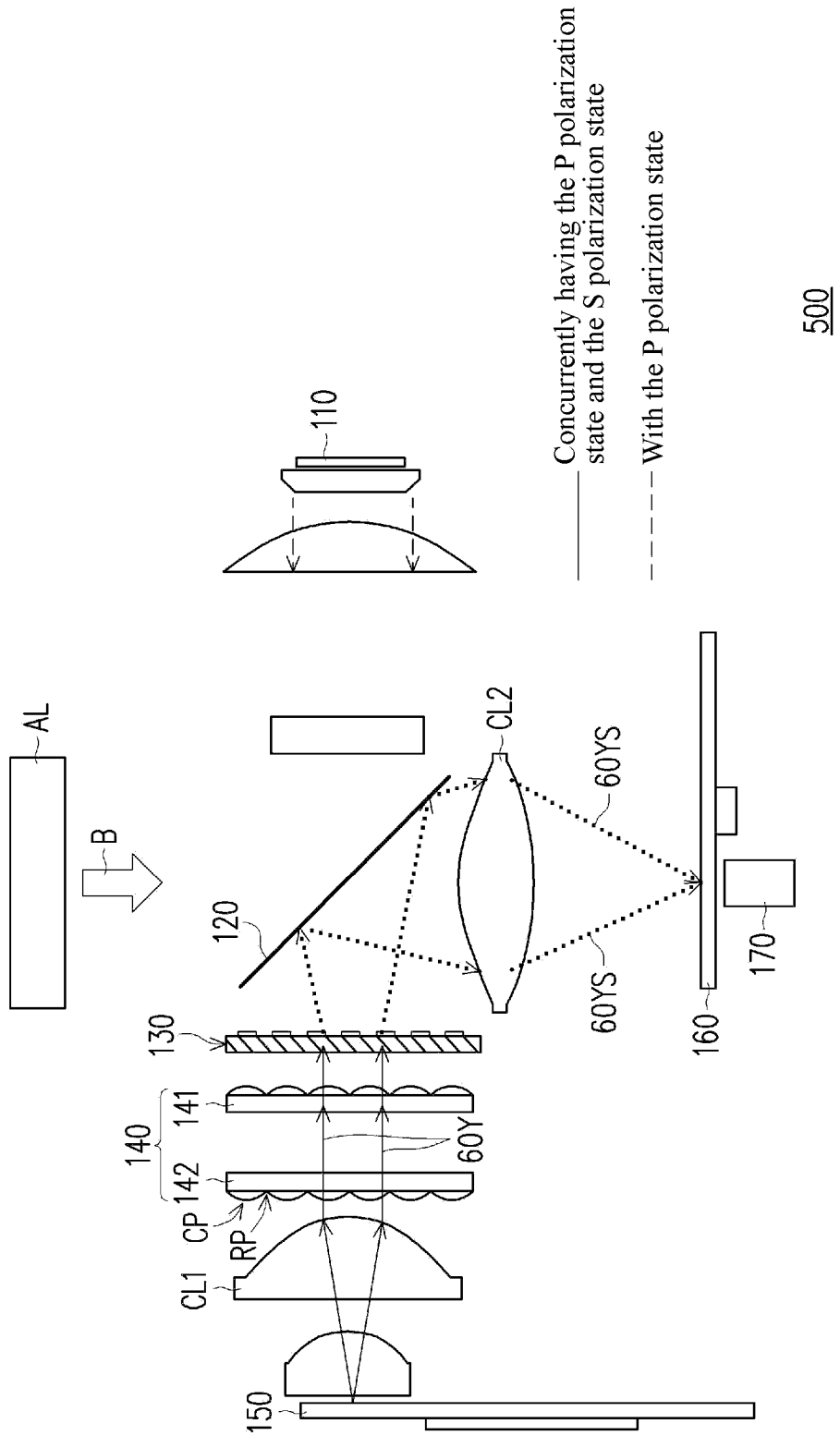
FIG. 5B is a schematic diagram of optical paths of the wavelength conversion beam and an auxiliary beam of the illumination system in FIG. 5A.

FIG. 5A is a structural schematic diagram of another illumination system and the optical path of the laser beam of FIG. 1. FIG. 5B is a schematic diagram of optical paths of the wavelength conversion beam and an auxiliary beam of the illumination system in FIG. 5A. An illumination system 500 in FIG. 5A is similar to the illumination system 100 in FIG. 2A, except for the following difference. As shown in FIGS. 5A and 5B, in the embodiment, the illumination system 500 further includes an auxiliary light source AL, which is configured to provide an auxiliary beam B. A polarization state of the auxiliary beam B is, for example, the first polarization state, and the first polarization state is, for example, the horizontal polarization state (the P polarization state). For example, in the embodiment, the auxiliary light source AL may include a plurality of blue laser diodes arranged in an array, and the auxiliary beam B is a blue laser beam. In this way, since the auxiliary beam B may be configured to provide a blue light part of the illumination beam 70, in the embodiment, the wavelength conversion module 150 does not need to be disposed with the non-conversion region, and may only be configured with the wavelength conversion region. In this way, the laser beam 50B is directly converted into the wavelength conversion beam 60Y without forming the laser beam 60B after it is incident on the wavelength conversion module 150.

As a result, as shown in FIGS. 5A and 5B, in the embodiment, the polarized beam splitting sheet 120 is deposed on a transmission path of the wavelength conversion beam 60YS formed by the auxiliary beam B and the wavelength conversion beam 60Y by the polarization conversion unit 130. In the embodiment, the polarized beam splitting sheet 120 may be configured to allow the beam with the first polarization state to pass through and reflect the beam with the second polarization state (for example, the S polarization state). Therefore, the wavelength conversion beam 60YS with the second polarization state formed by the polarization conversion unit 130 may be reflected by the polarized beam splitting sheet 120, and the polarized beam splitting sheet 120 may allow the auxiliary beam B with the first polarization state to pass through. The auxiliary beam B, after passing through the polarized beam splitting sheet 120, may form the illumination beam 70 with the wavelength conversion beam 60YS by the filter module 160 and be transmitted to the light valve 210 (shown in FIG. 1).

As a result, since the structure and alignment of the polarization conversion unit 130 and the micro lens array 140 of the illumination system 500 are similar to those of the illumination system 100, the illumination system 500 may increase the options in the disposition positions of the light source, and reduce the size of the device through the disposition and alignment of the polarization conversion unit 130 and the micro lens array 140, thereby providing the advantages similar to the illumination system 100, which may not be repeated here. Moreover, when the illumination system 500 is applied to the projection device 200 in FIG. 1, the projection device 200 is also able to provide the advantages, which may not be repeated here.

In addition, the illumination systems 300 and 400 in FIGS. 3A and 4A may also be disposed with the auxiliary light source AL and form a structure similar to the illumination system 500 in FIG. 5A, thereby providing the advantages similar to the illumination system 100, which may not be repeated here. Moreover, when the illumination systems 100 are applied to the projection device 200 in FIG. 1, the projection device 200 is also able to provide the advantages, which may not be repeated here.

In summary, the embodiments of the disclosure have at least one of the following advantages. In the embodiment of the disclosure, the illumination system and the projection device may enable the laser beam provided by the laser light source to be incident on the polarized beam splitting sheet and the subsequent optical elements in the forward direction through the disposition of the polarization conversion unit, thereby increasing the options in the disposition positions of the light source. In addition, since the micro lens array is disposed on the paths of the laser beam and the wavelength conversion beam in the illumination system and the projection device, the size of the projection device may be reduced while the laser beam and wavelength conversion beam are homogenized concurrently. In addition, in the embodiment, the transmission paths of the laser beam and the wavelength conversion beam after being emitted from the wavelength conversion module are exactly the same. In this way, the overall uniformity of the illumination beam and the image frame can be increased.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An illumination system, configured to provide an illumination beam, wherein the illumination system comprises a laser light source, a wavelength conversion module, and a polarization conversion unit, wherein
the laser light source is configured to provide a laser beam,
the wavelength conversion module has a wavelength conversion region, and the wavelength conversion module is deposed on a transmission path of the laser beam, wherein the laser beam is converted into a wavelength conversion beam by the wavelength conversion region, a part of the wavelength conversion beam has a first polarization state, and another part of the wavelength conversion beam has a second polarization state, and
the polarization conversion unit is located between the wavelength conversion module and the laser light source, wherein the polarization conversion unit has a plurality of first polarization conversion regions and a plurality of second polarization conversion regions,
wherein the polarization conversion unit comprises a plurality of phase delay sheets correspondingly located on a plurality of surfaces facing the laser light source and located in the plurality of second polarization conversion regions of the polarization conversion unit, the wavelength conversion beam with the second polarization state leaves the polarization conversion unit after passing through a surface of the polarization conversion unit located in the plurality of first polarization conversion regions facing the laser light source, and the wavelength conversion beam with the first polarization state leaves the polarization conversion unit after passing through the phase delay sheet located in the second polarization conversion region.

2. The illumination system according to claim 1, wherein a polarization state of the laser beam emitted from the laser light source is the first polarization state.

3. The illumination system according to claim 2, wherein the polarization conversion unit has a first surface and a second surface opposite to each other, the first surface faces the laser light source and the second surface faces the wavelength conversion module, the polarization state of the laser beam incident on the plurality of second polarization conversion regions from the first surface of the polarization conversion unit is transformed to the second polarization state after leaving through the second surface of the polarization conversion unit, and the polarization state of the laser beams incident on the plurality of first polarization conversion regions from the first surface of the polarization conversion unit is still the first polarization state after leaving through the second surface of the polarization conversion unit.

4. The illumination system according to claim 3, wherein a part of the laser beam incident from the second surface of the polarization conversion unit has the first polarization state, and another part has the second polarization state, the laser beam with the second polarization state leaves the polarization conversion unit after passing through the surface of the first polarization conversion region facing the laser light source, and the laser beam with the first polarization state leaves the polarization conversion unit after passing through the phase delay sheet located in the second polarization conversion region.

5. The illumination system according to claim 1, wherein each of the first polarization conversion regions and each of the second polarization conversion regions are disposed in a staggered manner.

6. The illumination system according to claim 1, wherein interior of the polarization conversion unit has a plurality of polarized beam splitting films, which are correspondingly disposed on a plurality of polarized beam splitting surfaces, wherein the plurality of polarized beam splitting surfaces are interfaces between the first polarization conversion regions and the second polarization conversion regions that are adjacent to each other, and the polarized beam splitting film is configured to allow a beam with the first polarization state to pass through and reflect a beam with the second polarization state.

7. The illumination system according to claim 6, further comprising:
a micro lens array, located between the polarization conversion unit and the wavelength conversion module, wherein the micro lens array has a plurality of convex portions and a plurality of recessed portions, each of the recessed portions is configured to connect to two of the convex portions adjacent to it, and a central optical axis of each of the convex portions respectively passes through each of the phase delay sheets.

8. The illumination system according to claim 1, wherein interior of the polarization conversion unit has a plurality of polarized beam splitting films, which are correspondingly disposed on a plurality of polarized beam splitting surfaces, wherein the plurality of polarized beam splitting surfaces are interfaces between the first polarization conversion regions and the second polarization conversion regions that are adjacent to each other, and the polarized beam splitting film is configured to allow a beam with the second polarization state to pass through and reflect a beam with the first polarization state.

9. The illumination system according to claim 8, further comprising:
  a micro lens array, located between the polarization conversion unit and the wavelength conversion module, wherein the micro lens array has a plurality of convex portions and a plurality of recessed portions, each of the recessed portions is configured to connect to two of the convex portions adjacent to it, and a central optical axis of each of the convex portions is respectively exempted from passing through each of the phase delay sheets.

10. The illumination system according to claim 1, wherein the wavelength conversion module further comprises a non-conversion region, and the wavelength conversion module is configured to rotate around an axis of rotation, and enable the wavelength conversion region and the non-conversion region to be alternately on the transmission path of the laser beam, and the laser beam is reflected by the non-conversion region when the non-conversion region is on the transmission path of the laser beam.

11. The illumination system according to claim 1, further comprising:
  a polarized beam splitting sheet, located between the laser light source and the polarization conversion unit, wherein the polarized beam splitting sheet is configured to allow a beam with the first polarization state to pass through and reflect a beam with the second polarization state.

12. The illumination system according to claim 11, further comprising:
  an auxiliary light source, configured to provide an auxiliary beam, wherein the polarized beam splitting sheet is deposed on a transmission path of the auxiliary beam, and the auxiliary beam forms the illumination beam with the wavelength conversion beam after passing through the polarized beam splitting sheet.

13. A projection device, comprising an illumination system, a light valve and a projection lens, wherein
  the illumination system is configured to provide an illumination beam, and comprises a laser light source, a wavelength conversion module, and a polarization conversion unit, wherein
    the laser light source is configured to provide a laser beam,
    the wavelength conversion module has a wavelength conversion region, and the wavelength conversion module is deposed on a transmission path of the laser beam, wherein the laser beam is converted into a wavelength conversion beam by the wavelength conversion region, a part of the wavelength conversion beam has a first polarization state, and another part of the wavelength conversion beam has a second polarization state, and
    the polarization conversion unit is located between the wavelength conversion module and the laser light source, wherein the polarization conversion unit has a plurality of first polarization conversion regions and a plurality of second polarization conversion regions, wherein the polarization conversion unit comprises a plurality of phase delay sheets correspondingly located on a plurality of surfaces facing the laser light source and located in the plurality of second polarization conversion regions of the polarization conversion unit, the wavelength conversion beam with the second polarization state leaves the polarization conversion unit after passing through a surface of the polarization conversion unit located in the plurality of first polarization conversion regions facing the laser light source, and the wavelength conversion beam with the first polarization state leaves the polarization conversion unit after passing through the phase delay sheet located in the second polarization conversion region,
  the light valve is deposed on a transmission path of the illumination beam, and is configured to convert the illumination beam into an image beam; and
  the projection lens is deposed on a transmission path of the image beam, and is configured to project the image beam out of the projection device.

14. The projection device according to claim 13, wherein a polarization state of the laser beam emitted from the laser light source is the first polarization state.

15. The projection device according to claim 14, wherein the polarization conversion unit has a first surface and a second surface opposite to each other, the first surface faces the laser light source and the second surface faces the wavelength conversion module, the polarization state of the laser beam incident on the plurality of second polarization conversion regions from the first surface of the polarization conversion unit is transformed to the second polarization state after leaving through the second surface of the polarization conversion unit, and the polarization state of the laser beams incident on the plurality of first polarization conversion regions from the first surface of the polarization conversion unit is still the first polarization state after leaving through the second surface of the polarization conversion unit.

16. The projection device according to claim 15, wherein a part of the laser beam incident from the second surface of the polarization conversion unit has the first polarization state, and another part has the second polarization state, the laser beam with the second polarization state leaves the polarization conversion unit after passing through the surface of the first polarization conversion region facing the laser light source, and the laser beam with the first polarization state leaves the polarization conversion unit after passing through the phase delay sheet located in the second polarization conversion region.

17. The projection device according to claim 13, wherein each of the first polarization conversion regions and each of the second polarization conversion regions are disposed in a staggered manner.

18. The projection device according to claim 13, wherein interior of the polarization conversion unit has a plurality of polarized beam splitting films, which are correspondingly disposed on a plurality of polarized beam splitting surfaces, wherein the plurality of polarized beam splitting surfaces are interfaces between the first polarization conversion regions and the second polarization conversion regions that are adjacent to each other, and the polarized beam splitting film is configured to allow a beam with the first polarization state to pass through and reflect a beam with the second polarization state.

19. The projection device according to claim 18, wherein the illumination system further comprises:
  a micro lens array, located between the polarization conversion unit and the wavelength conversion module, wherein the micro lens array has a plurality of convex portions and a plurality of recessed portions, each of the recessed portions is configured to connect to two of the convex portions adjacent to it, and a central optical axis of each of the convex portions respectively passes through each of the phase delay sheets.

20. The projection device according to claim 13, wherein interior of the polarization conversion unit has a plurality of polarized beam splitting films, which are correspondingly disposed on a plurality of polarized beam splitting surfaces, wherein the plurality of polarized beam splitting surfaces are interfaces between the first polarization conversion regions and the second polarization conversion regions that are adjacent to each other, and the polarized beam splitting film is configured allow to a beam with the second polarization state to pass through and reflect a beam with the first polarization state.

21. The projection device according to claim 20, wherein the illumination system further comprises:
  a micro lens array located between the polarization conversion unit and the wavelength conversion module, wherein the micro lens array has a plurality of convex portions and a plurality of recessed portions, each of the recessed portions is configured to connect to two of the convex portions adjacent to it, and a central optical axis of each of the convex portions is respectively exempted from passing through each of the phase delay sheets.

22. The projection device according to claim 13, wherein the wavelength conversion module further comprises a non-conversion region, and the wavelength conversion module is configured to rotate around an axis of rotation, and enable the wavelength conversion region and the non-conversion region to be alternately on the transmission path of the laser beam, and the laser beam is reflected by the non-conversion region when the non-conversion region is on the transmission path of the laser beam.

23. The projection device according to claim 13, wherein the illumination system further comprises:
  a polarized beam splitting sheet, located between the laser light source and the polarization conversion unit, wherein the polarized beam splitting sheet is configured to allow a beam with the first polarization state to pass through and reflect a beam with the second polarization state.

24. The projection device according to claim 23, wherein the illumination system further comprises:
  an auxiliary light source, configured to provide an auxiliary beam, wherein the polarized beam splitting sheet is deposed on a transmission path of the auxiliary beam, and the auxiliary beam forms the illumination beam with the wavelength conversion beam after passing through the polarized beam splitting sheet.

* * * * *